United States Patent [19]

Tickle

[11] Patent Number: 5,670,988
[45] Date of Patent: Sep. 23, 1997

[54] TRIGGER OPERATED ELECTRONIC DEVICE

[75] Inventor: James Dexter Tickle, Thousand Oaks, Calif.

[73] Assignee: Interlink Electronics, Inc., Camarillo, Calif.

[21] Appl. No.: 523,716

[22] Filed: Sep. 5, 1995

[51] Int. Cl.$^6$ ..................................................... G09G 5/08
[52] U.S. Cl. .............................. 345/157; 345/161; 463/37
[58] Field of Search ..................................... 345/156, 157, 345/158, 159, 160, 161, 163, 169; 463/36–39, 47, 46; 200/6 A; D14/218; 348/734; 273/148 R

[56] References Cited

U.S. PATENT DOCUMENTS

| | | | |
|---|---|---|---|
| D. 328,463 | 8/1992 | King et al. | D14/218 |
| D. 331,058 | 11/1992 | Morales | D14/218 |
| D. 344,952 | 3/1994 | Bartholomew | D14/218 |
| 4,465,908 | 8/1984 | Griffith et al. | 345/157 |
| 4,552,360 | 11/1985 | Bromley et al. | 345/159 |
| 4,578,674 | 3/1986 | Baker et al. | 345/159 |
| 4,647,916 | 3/1987 | Boughton | 345/156 |
| 4,739,128 | 4/1988 | Grisham | 200/6 A |
| 5,172,101 | 12/1992 | Bates | 345/156 |
| 5,207,426 | 5/1993 | Inoue et al. | 345/184 |
| 5,253,068 | 10/1993 | Crook et al. | 358/194.1 |
| 5,296,871 | 3/1994 | Paley | 345/156 |
| 5,367,316 | 11/1994 | Ikezaki | 345/158 |
| 5,563,628 | 10/1996 | Stroop | 345/156 |

FOREIGN PATENT DOCUMENTS 2244546 12/1991 United Kingdom.

Primary Examiner—Steven Saras
Attorney, Agent, or Firm—Stoel Rives LLP

[57] ABSTRACT

A device particularly for use with a computer comprises a housing for location at least partly between two fingers of a user's hand and an electronic circuit mounted on a board within the housing. The circuit includes a switch responsive to pressure selectively to open and close an electronic circuit, and conductive elements arranged on the board mounting the electronic circuit. A first control element is mounted with the housing and responsive to finger pressure such that pressure applied to the first control element causes the element to operate the switch. The first control element is movable with respect to a hinge such that finger action acts to cause the control element to swivel as a trigger about the hinge and thereby interact with the switch. The second control element includes a flexible material mounted such that pressure applied to the flexible material in different directions and positions acts to change the electrical relationship between the conductive elements on the board and thereby vary an output signal from the electronic circuit. The rear portion of the housing includes a receptacle for receiving removable battery power supply for powering the electronic circuit. There is an infra-red output signal transmitted to a receiver for operating the computer. The first control element is located substantially below the second control element, and the first control element being in a bottom face of the housing.

19 Claims, 3 Drawing Sheets

TRIGGER OPERATED ELECTRONIC DEVICE

BACKGROUND

Having an ergonomically effective mouse for operating a computer is highly desirable.

This invention relates to a trigger operated electronic device. In particular, it concerns a mouse for operating a cursor in a computer system.

A conventional mouse for operating a computer system is one which is hard wired to the computer and which physically moves over a base. The mouse movement is effected by having a hand grasp the top of the unit and moving the mouse on the base. Below the top of the unit there is a ball mounted in a track and as the ball rotates, the mouse moves on the base. There are usually at least two switches on the top face of the mouse. Pressing one or more switches in an appropriate sequence and for appropriate times causes an electrical signal to be transmitted from the mouse to the computer, which is then operated. Conventionally, the shape of the mouse is one which fits under the palm of the hand when the palm of the hand is turned to face downwardly.

This mouse is a relatively clumsy system for computer operation. What is particularly unwieldy is the fact that the hand of an operator needs to be moved to the location of the mouse on a mouse pad or base. This is particularly inconvenient because the operator's hands also need to be available for use to operate a computer keyboard or for use for other purposes unassociated with the computer. This difficulty is further compounded by the fact that the mouse pad is usually located in a removed position relative to the other computer components. One therefore finds that operating a computer with a mouse in this hard wired fashion, while one is doing extra work, is relatively awkward.

There is, accordingly, a need to provide a mouse system for operating an electronic device such as a computer which is ergonomically and functionally more satisfactory than known systems.

SUMMARY

By this invention, there is provided a system which minimizes the disadvantages of the prior devices and systems.

According to the invention there is provided a trigger operated device in the nature of a pointing device for use with an electronic system such as a computer. The pointing device is one which performs the function of a mouse. The mouse is portable or self-contained in that it does not operate on a base.

There is a housing for location at least partly between two fingers of a hand and an electronic circuit mounted on a board within the housing.

The circuit includes a switch responsive to pressure selectively to open and close an electronic circuit, and conductive elements arranged on the board mounting the electronic circuit.

A first control element is mounted with the housing and is responsive to finger pressure such that pressure applied to the first control element causes the element to operate the switch. The first control element is movable with respect to a hinge. Finger action acts to cause the control element to swivel as a trigger about the hinge and thereby interact with the switch.

A second control element includes a transducer that includes a flexible material. Pressure applied to the flexible material in different directions and positions acts to change the electrical relationship between the conductive elements on the board and thereby vary an output signal from the electronic circuit.

The rear portion of the housing member includes a receptacle for receiving removable battery means for powering the electronic circuit.

The first control element is located substantially below the second control element. The first control element is in a bottom face of the housing.

In a preferred form of the invention the housing includes two ports. A first port is for locating the first control element, and a second port for locating the second control element.

Also in a preferred form of the invention, both the first control element and the second control element are located in a relatively forward position of the housing. The first control element is adapted for operation by the index finger of a hand, and the second control element is adapted for operation by the thumb of the user's hand.

Preferably, the rear portion of the housing means is adapted for location generally in at least part of a palm of the hand. The first control element is for engagement with the index finger, and the second control element is for engagement with the thumb.

The housing preferably includes a contoured step, the contoured step receives the first control element. The contoured step has a first face for generally providing a rest location for the index finger and a rear face for generally providing a rest position for a forefinger of a hand.

There is an infra-red output signal transmitted relatively from the electronic circuit to a receiver for operating the computer.

In some other preferred forms of the invention there is a third control element. The third control element is located in a spaced location from the second control element for selective operation by a thumb of a hand. Preferably, the third control element is movable relatively inwardly and outwardly relative to an outer surface of the housing. A second switch for the electronic circuit is operable under interaction from the third control element thereby to generate switching signals for the electronic circuit.

The invention is further described with reference to the accompanying drawings.

DRAWINGS

The present invention, both as to its organization and manner of operation, together with further objects and advantages thereof, may best be understood with reference to the following description, taken in connection with the accompanying drawings in which.

DESCRIPTION

Figure 1:
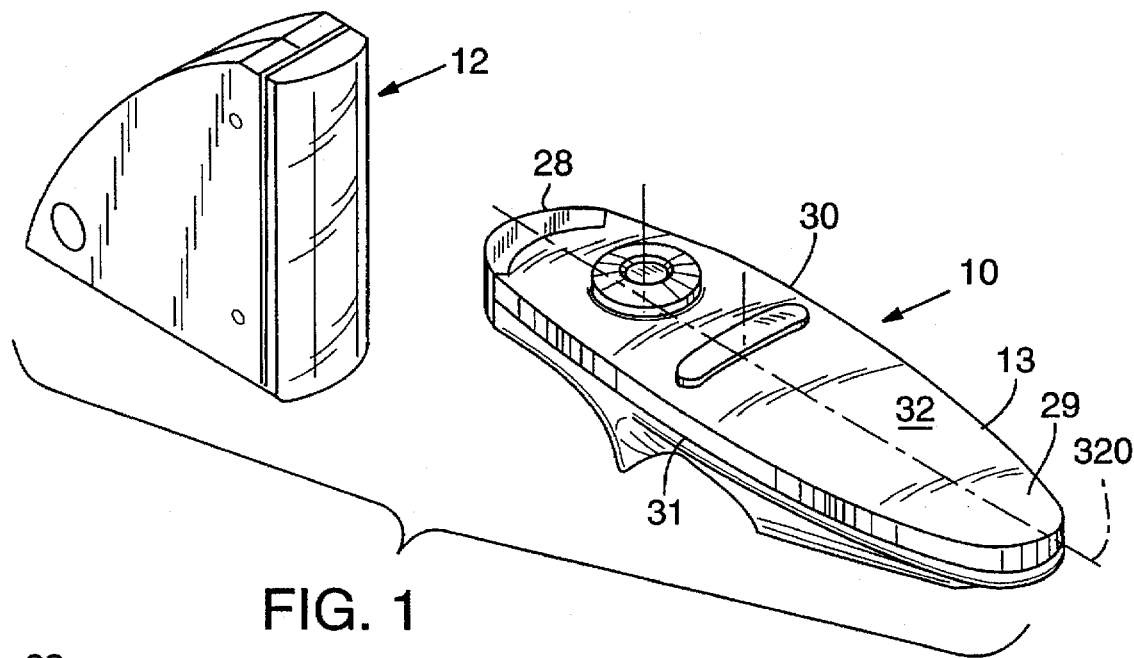
FIG. 1 is a perspective view from the top of a mouse in relation to a receiver for receiving signals from the mouse for operating an electronic system.
Figure 2:
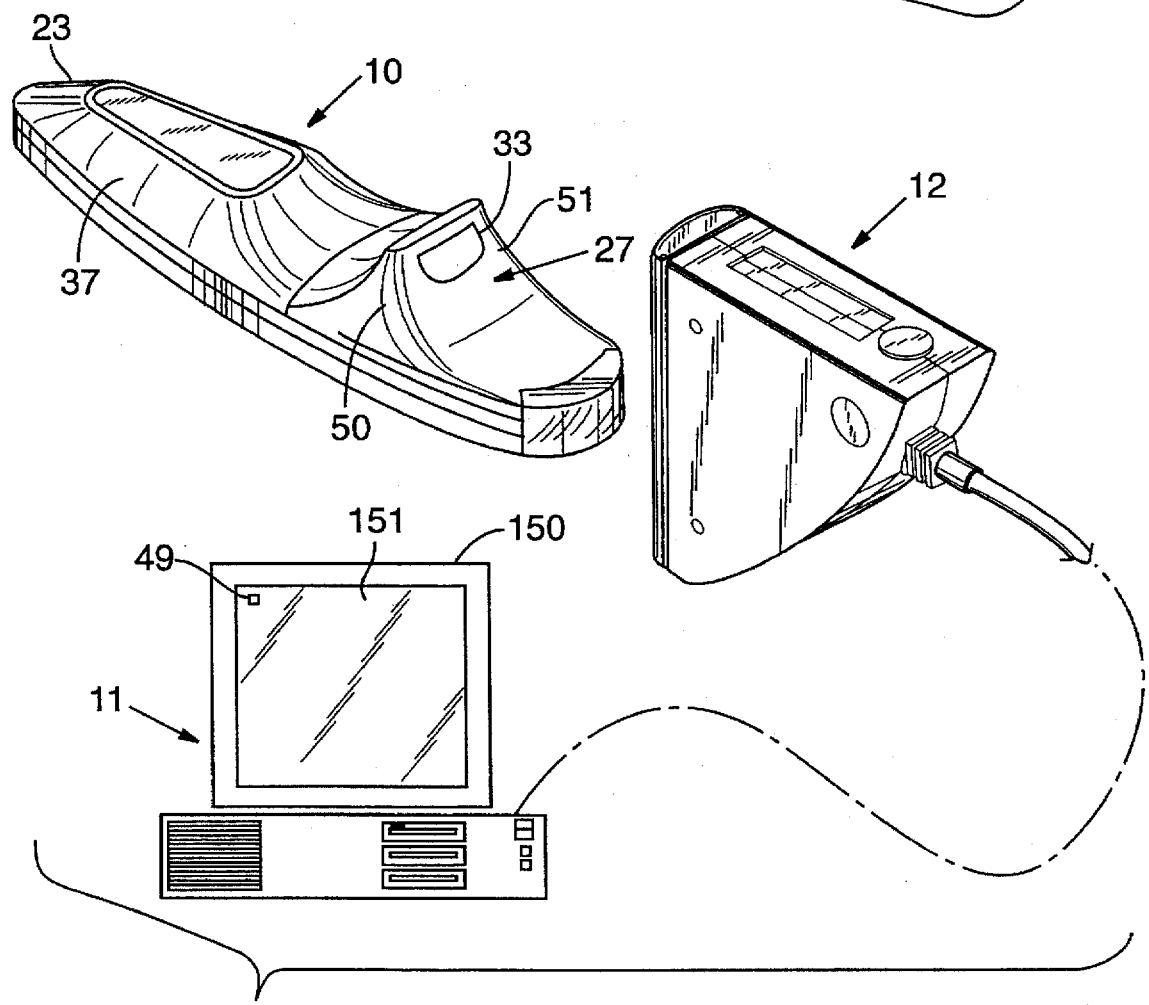
FIG. 2 is a perspective view of the mouse from underneath together with the receiver from underneath, the receiver shown hard wired to a computer.
Figure 3:
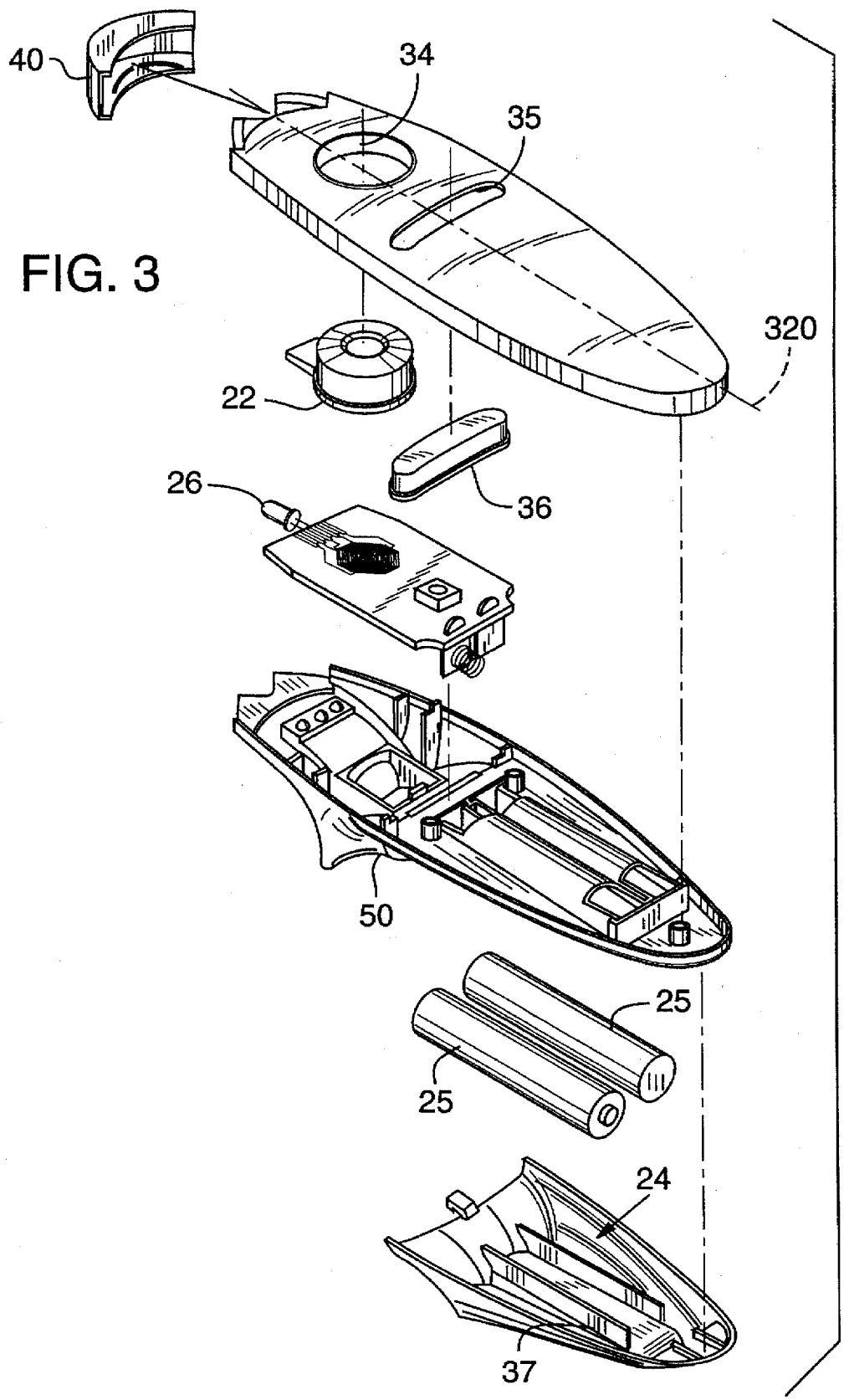
FIG. 3 is an exploded perspective view of the mouse showing various components.
Figure 4:
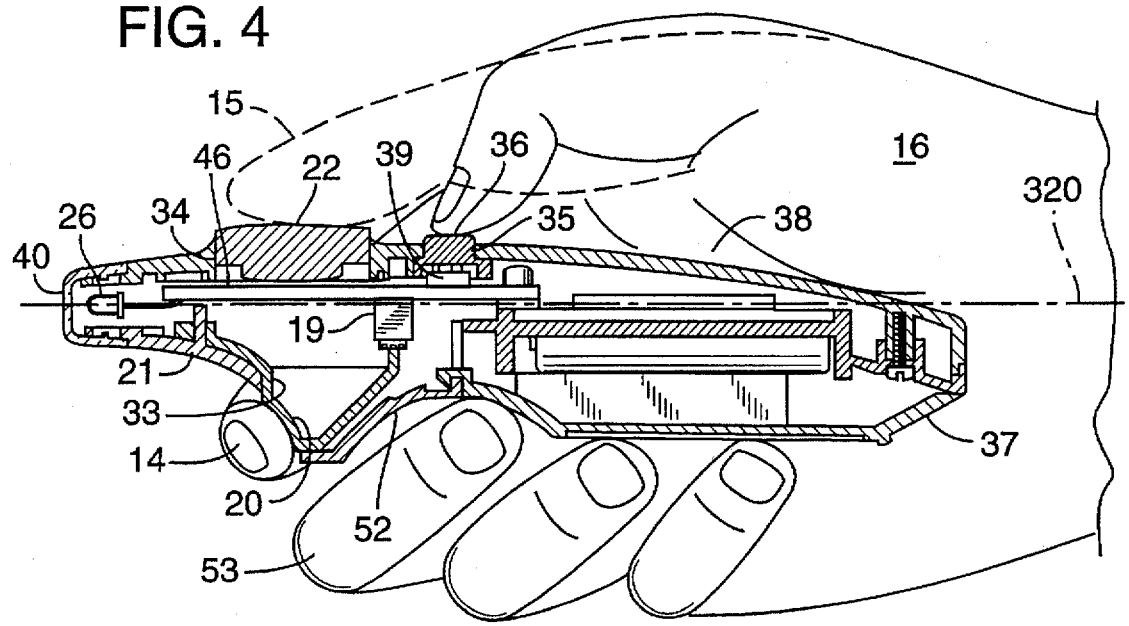
FIG. 4 is a sectional side elevation view of the mouse showing the location of the user's hand in relation to different components of the mouse.

A mouse pointing device 10 is for use with a computer 11. There is a receiver 12 between the mouse 10 and the computer 11. A housing 13 for the mouse is formed for location at least partly between two fingers 14 and 15 of a hand 16.

There is an electronic circuit 17 mounted on a board 18 within the housing 13. The circuit 17 includes a first switch 19 responsive to pressure selectively to open and close the electronic circuit 17. There are conductive elements 200 arranged on the board 18 sharing the electronic circuit 17. The operation of the circuit is described further below.

A first control element 20 is mounted with the housing 13 and is responsive to pressure from finger 14 such that pressure applied to the first control element 20 causes the element 20 to operate the switch 19. The first control element 20 is movable with respect to a hinge 21 such that action from finger 14 acts to cause the control element 20 to swivel as a trigger about the hinge 21 and thereby interact with the switch 19.

A second control element 22 is a button and acts as a transducer and includes a flexible material. The element 22 is mounted such that pressure applied to the flexible material in different directions and positions acts to change the electrical relationship between the conductive elements 200 on the board 18. This varies an output signal from the electronic circuit 17.

The rear portion 23 of the housing 13 includes a receptacle 24 for receiving removable battery means 25 for powering the electronic circuit 17.

There is a LED device 26 for emitting an infra-red output signal for transmission to the receiver 12 for operating the computer 11. The first control element 20 is located substantially below the second control element 22, and the first control element 20 is in a bottom face 27 of the housing 13.

HOUSING

The housing 13 has a forward end 28, a rear end 29, opposed sides 30 and 31, a top face 32 and a bottom face 27. The top face 32 is of a generally elliptical shape, the elliptical shape being substantially elongated in the direction defined by a longitudinal axis 320.

The housing 13 includes three ports 33, 34, and 35. A first port 33 is for locating the first control element 20, a second port 34 is for locating the second control element 22, and a third port 35 is for locating a third control element 36.

The rear portion 23 of the housing 13 includes a belly portion 37 depending downwardly from the housing 13 for receiving at least portion of a battery means 25. The belly portion 37 is for resting in at least a portion of a palm 38 of the hand 16.

Both the first control element 20 and the second control element 22 are located in a relatively forward position of the housing 13. The first control element 20 is adapted for operation by the index finger 14 of the hand 16. The second control element 22 is adapted for operation by the thumb 15 of the hand 16.

ELECTRONIC CIRCUIT

The electronic circuit 17 includes switches 19 and 39 responsive to pressure selectively to open and close the electronic circuit 17.

The electronic circuit 17 provides an output signal to device 26 to transmit the output signal to the receiver 12 for operating the computer 11. The output device 26 includes the LED infra-red light generator. There are means for mounting the infra-red LED light generator 26 in the forward end 28 of the housing 13. A window shade or window screen 40 is located in the forward portion 28 of the housing 13, the screen 40 being for covering the infra-red LED output device 26.

Figure 5:
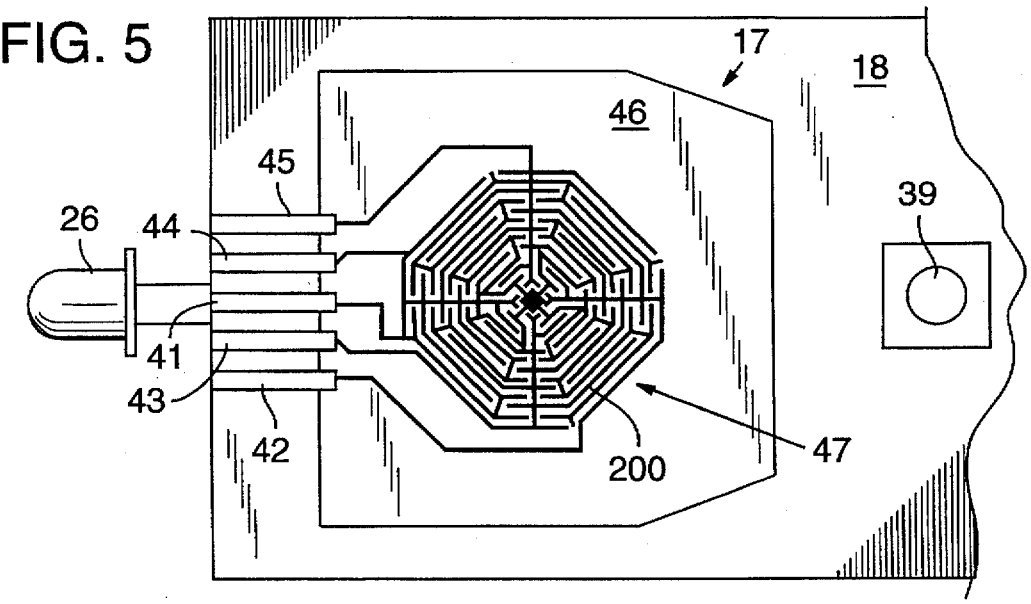
FIG. 5 is a top view of the electronic board for operating the electronic circuit of the mouse.
Figure 6:
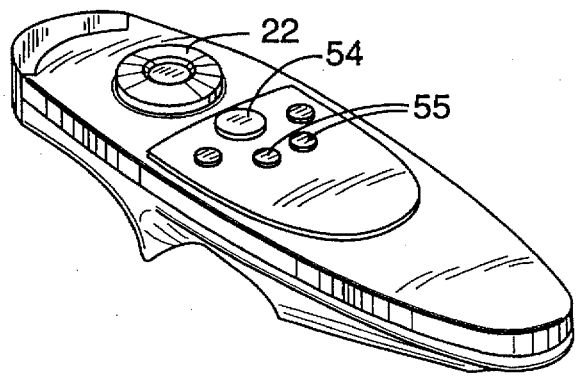
FIG. 6 is a perspective view from the top illustrating a different form of a mouse with different control elements.

The pressure transducer of the electronic circuit operates as described with relation to FIG. 5.

The overlay arrangement conductive of element 200 has five different terminals labeled 41–45. Underneath the overlay conductive elements 200 is a conductive plate 46, with a given resistance per unit square (e.g., 500 Ω/square mm).

The terminals 41–45 are respectively connected to different traces 47 on the conductive elements 200, all of which are conductive. The more of the conductive traces 47 that touch the conductive plate 46, the smaller the resistance. There is a larger current carrying area for the electrons.

Terminal 41 is the common trace. It has "fingers" that interleave with all of the other traces. Trace 41 completes the circuit for all other traces.

Trace 42 is the "Down" trace. Trace 43 is the "Left" trace. Trace 44, is the "Up" trace. Trace 45 is the "Right" trace.

As a user presses down on the bottom of the control element 22, the pressure forces contact between the trace 41, and one or more of the other four traces 42 to 45, and the conductive plate 46.

For example, two scenarios are explained on how the pressure transducer works. The first example is that the user wants the cursor 49 on the computer monitor 150 of computer 11 to move straight up or north on the screen 151, and the second example is that the user wants the cursor 49 to move in a southwesterly direction on the screen 151.

EXAMPLE 1

Straight up (North).

For the user to move the cursor 49 straight north, the user would naturally push the thumb 15 forward, or towards the LED emission window 40 on the mouse 10. This motion would cause contact between trace 44, trace 41, and the conductive plate 46 underneath the conductive elements 200. For about a forty degree path centered around the front of the mouse 10 there can be no contact with any trace except the traces 41 and 44.

When the user wants to move the mouse 10 faster, the user would naturally press harder in the forward direction. This additional pressure causes additional contact between the longer fingers of traces 47 towards the outside of the hexagonal conductive elements 200, reducing the resistance and causing more current to flow. This will increase the speed of the cursor movement on the screen 151.

EXAMPLE 2

Southwesterly direction.

For the user to move the cursor 49 in a southwesterly direction, the user would naturally pull the thumb 15 back. For a right-handed mouse user, this would push the thumb away from the palm 16. This motion would cause the trace 41 to contact the trace 43, which moves the cursor 49 to the left, and also cause the trace 44 to contact the trace 42. This moves the cursor 49 down. As with example 1, the harder the user presses in that direction, the larger the contact area between the traces 47 and the conductive plate 46, making the cursor 49 move faster.

Any other movement is a similar motion to the above two examples.

The electronic circuit 17 operates as follows:

As the user applies pressure to one or more of the four quadrants underneath the second switch button 22, the conductive plate 46 for that quadrant becomes connected to the common portion of the plate 46. As more pressure is applied, the resistance decreases, since there is more current carrying area when more pressure is applied, therefore reducing the overall resistance. Since the voltage is constant, the current must increase to compensate for this change in resistance.

As the current changes, the resistors, capacitors, and driver for the LED 26 change the intensity of the light emanating from the LED 26. The circuit 17 can also perform the transformation from current into an increase in pulse repetition frequency (PRF), or from current into a different coding scheme to indicate a faster movement of the cursor 49.

Pressing switch 22 is analogous to pressing one of the buttons on a tabletop mouse or trackball. When the switch button 22 is pressed, a momentary contact is made within the supporting circuit, and a corresponding signal indicating that the button 22 has been pressed is transmitted to the LED 26, which transmits a signal propagating in a direction generally along longitudinal axis 320 to the receiver 12 at the computer 11.

FIRST CONTROL ELEMENT

The first control element 20 is responsive to finger pressure such that pressure applied to the first control element 20 causes it to operate the switch 19 to open and close electronic. The first control element 20 is located in a position of the housing 10 to act as a trigger movable under pressure at least partly towards the rear end 29 of the housing 13. Such movement acts to operate the switch 19, which moves inwardly or outwardly for the electronic circuit. The switch 19 is a mechanical element, and its action can affect a click or drag of the cursor.

SECOND CONTROL ELEMENT

The second control element 22 is mounted with the housing 13 and is responsive to thumb pressure. The pressure on the second element 22 on a selected place and direction acts to change the electrical condition between the conductive traces 47 and the plate 46.

The housing 13 includes a contoured step 50 for receiving the first control element 20. The contoured step 50 has a first face 51 for generally providing a rest location for the index finger 14 and a rear face 52 for generally providing a rest position for a forefinger 53 of the hand 16.

The first control element 20 is located towards one of the narrow ends of the elliptical shape. The first control element 20 is located substantially below the second control element 22.

In a different embodiment there are third and further control elements 54 and 55. (Third control element 54 is in approximately the same location as but is of different shape from that or control element 36 of the previously described embodiment.). These additional control elements 54 and 55 are located in a spaced location from the second control element 22. The further control elements 54 and 55 are for selective operation by the thumb 15 of a hand 16. The third control element 54 is movable relatively inwardly and outwardly relative to top face 32 of the housing 13. There is a switch 39 for the electronic circuit 17, and the switch 39 is operable under interaction from the third control element 54 thereby to generate switching signals to the electronic circuit 17.

GENERAL

Many other forms of the invention exist, each differing from others in matters of detail only.

There can be multiple control elements located on the housing. The multiple control elements are responsive to finger pressure to operate switch elements related with each respective control element thereby to control the operation of the electronic circuit.

In some other examples of the invention, instead of having a transducer operating with an electrical conductor array to be responsive to pressure relative to a conductive plate, it is possible to have the transducer interact with an optical array transducer or pressure sensitive TrakPoint (TM) pointer as is typically used on IBM Thinkpad (TM) computers.

Moreover there can be embodiments where the device can be used to signal electronic devices and systems responsive to signals from the first trigger type control member or one or more other control members on the housing. As such, the electronic device could be desired to activate other remote electronic elements such as VCRs and TVs. In some cases, the electronic device is hard wired directly to the electronically responsive device.

The invention is to be determined solely in terms of the following claims.

What is claimed is:

1. A portable, trigger operated pointing device for use with an electronically responsive system, comprising:
    a housing for location at least partly between first and second fingers of a user's hand, the housing having an elongate profile defining a longitudinal axis and having a forward end, a rear end, opposed sides, a top face, and a bottom face, the bottom face including a contoured step positioned medially of the forward and rear ends and transversely of the opposed sides, the contoured step having a first face for generally providing a rest location for the first finger of the user's hand;
    an electronic circuit mounted on a board contained within the housing, the circuit including on opposite sides of the board a switch responsive to pressure selectively to open and close an electronic circuit and a transducer responsive element;
    a first control element mounted with the housing at the first face of the contoured step and operatively connected to the switch to respond to pressure applied by the first finger of the user's hand to operate the switch;
    a second control element mounted with the housing at the top face and responsive to force applied by the second finger of the user's hand such that force applied to the second element in a selected direction acts to cause a change in a condition of the transducer responsive element and thereby cause the electronic circuit to provide a corresponding output signal; and
    an output signal emitter responsive to the output signal provided by the electronic circuit and positioned to transmit from the forward end a transmitted output signal propagating in a direction generally along the longitudinal axis.

2. A device as claimed in claim 1, wherein the first control element is located in a position to act as a trigger movable under pressure at least partly towards the rear end, such movement acting to operate the switch for the electronic circuit, and the switch being a mechanical element for the circuit.

3. A device as claimed in claim 1, further including a hinge about which the first control element is movable, the hinge being located in a position nearer to the forward end of the housing, and the first control element being adapted for engagement with the first finger such that its movement against the first control element causes the first control element to swivel about the hinge and thereby interact with the switch.

4. A device as claimed in claim 1, wherein the board includes conductive elements and the second control element includes a flexible material mounted such that force applied to the flexible material in different directions and positions acts on the transducer to change an electrical relationship between the conductive elements and thereby vary the output signal provided by the electronic circuit.

5. A device as claimed in claim 1, wherein the housing includes a first port for housing the first control element and a second port for housing the second control element.

6. A device as claimed in claim 1, wherein the first control element and the second control element are located in a position nearer to the forward end of the housing, and wherein the first and second fingers are, respectively, the index finger and the thumb of the user's hand.

7. A device as claimed in claim 1, wherein the housing has a rear portion that includes a receptacle for receiving removable battery means for powering the electronic circuit.

8. A device as claimed in claim 7, wherein the rear portion of the housing is adapted for location generally in a palm of the user's hand, and the first finger is the index finger of the user's hand and the second finger is the thumb of the user's hand.

9. A device as claimed in claim 8, wherein the contoured step has a rear face for generally providing a rest position for a forefinger of the user's hand.

10. A device as claimed in claim 7, wherein the rear portion of the housing includes a belly portion depending downwardly from the housing for receiving at least portion of a power supply, the belly portion being positioned for resting in at least portion of a palm of the hand.

11. A device as claimed in claim 1, wherein the output signal emitter transmits the output signal in a form suitable for reception by a receiver for operating a computer.

12. A device as claimed in claim 11, wherein the output signal emitter includes an infra-red light generator and a mounting structure for mounting the infra-red light generator near the forward end of the housing.

13. A device as claimed in claim 1, wherein the second finger is the thumb of a user's hand, the device further including a third control element located in a spaced location from the second control element and positioned on the top face of the housing for selective operation by the thumb of the user's hand, the third control element being movable inwardly and outwardly relative to the top face of the housing and including a second switch for the electronic circuit, the second switch being operable under interaction with the third control element to generate switching signals to the electronic circuit.

14. A device as claimed in claim 1, further including multiple control elements located on the housing, the multiple control elements being responsive to externally applied pressure to operate switch elements corresponding to each respective control element thereby to control the operation of the electronic circuit.

15. A device as claimed in claim 12, further including a screen located at the forward end of the housing and covering the infra-red light generator.

16. A device as claimed in claim 1, wherein the top face is of a generally elliptical shape having a narrow end at the forward end of the housing, wherein the first control element is located nearer to the narrow end of the elliptical shape, and wherein the first control element is located substantially below the second control element in the bottom face of the housing.

17. A device as claimed in claim 1, wherein the first control element mounted at the first face of the contoured step included in the bottom face of the housing is located substantially below the second control element mounted at the top face of the housing.

18. A device as claimed in claim 1, wherein the transducer responsive element is of a type that responds to a lateral force applied by the second finger.

19. The device as claimed in claim 1, wherein the opposite sides of the board comprise bottom and top sides positioned nearer to the respective bottom and top faces of the housing, the switch being included on the bottom side of the board and the transducer responsive element being included on the top side of the board.

* * * * *